(12) United States Patent
Reeb et al.

(10) Patent No.: US 11,344,980 B2
(45) Date of Patent: May 31, 2022

(54) METHOD AND DEVICE FOR WORK-HARDENING A CRANKSHAFT

(71) Applicant: MASCHINENFABRIK ALFING KESSLER GMBH, Aalen (DE)

(72) Inventors: Alfons Reeb, Aalen (DE); Jochen Schmidt, Boebingen a.d. Rems (DE); Konrad Grimm, Aalen (DE)

(73) Assignee: MASCHINENFABRIK ALFING KESSLER GMBH

( * ) Notice: Subject to any disclaimer, the term of this patent is extended or adjusted under 35 U.S.C. 154(b) by 103 days.

(21) Appl. No.: 16/622,597

(22) PCT Filed: Jun. 4, 2018

(86) PCT No.: PCT/EP2018/064603
§ 371 (c)(1),
(2) Date: Dec. 13, 2019

(87) PCT Pub. No.: WO2018/228841
PCT Pub. Date: Dec. 20, 2018

(65) Prior Publication Data
US 2020/0216924 A1    Jul. 9, 2020

(30) Foreign Application Priority Data

Jun. 14, 2017    (DE) .................. 102017113088.8

(51) Int. Cl.
*B23P 9/04*    (2006.01)
*C21D 7/04*    (2006.01)
(Continued)

(52) U.S. Cl.
CPC ............... *B23P 9/04* (2013.01); *C21D 7/04* (2013.01); *B23P 2700/07* (2013.01); *C21D 7/02* (2013.01);
(Continued)

(58) Field of Classification Search
CPC ..... B23P 9/04; B23P 2700/07; C21D 7/02–08
See application file for complete search history.

(56) References Cited

U.S. PATENT DOCUMENTS 3,610,008 A    10/1971    Foedisch
4,171,654 A *    10/1979    Kreucher .................. B23B 5/18
                                                                                    409/189
(Continued)

FOREIGN PATENT DOCUMENTS

DE            3438742 C2      4/1986
DE          102006058710      6/2008
(Continued)

OTHER PUBLICATIONS

JP-2016169783-A English language translation (Year: 2016).*
JP-H042807-B2 English language translation (Year: 1992).*

*Primary Examiner* — Anthony J Zimmer
*Assistant Examiner* — Sean P. O'Keefe
(74) *Attorney, Agent, or Firm* — Harvey S. Kauget; Burr & Forman LLP

(57) ABSTRACT

The invention relates to a method for work-hardening a crankshaft (4) comprising connecting rod journals (5), main bearing journals (6) and crank webs (7), the connecting rod journals (5) and the main bearing journals (6) being provided with oil holes (31). According to the invention, at least one end (30) of one of the oil holes (31) and/or at least one cylindrical portion (38) of the oil holes (31) is/are work-hardened.

13 Claims, 7 Drawing Sheets

(51) Int. Cl.
 *C21D 7/02* (2006.01)
 *C21D 9/30* (2006.01)
 *C21D 7/06* (2006.01)

(52) U.S. Cl.
 CPC .............. *C21D 7/06* (2013.01); *C21D 9/30* (2013.01); *C21D 2221/00* (2013.01)

(56) References Cited

U.S. PATENT DOCUMENTS

| | | | |
|---|---|---|---|
| 4,682,489 | A | 7/1987 | Bauerle et al. |
| 6,160,248 | A | 12/2000 | Ottenwaelder et al. |
| 8,011,096 | B2 | 9/2011 | Reeb et al. |
| 9,015,939 | B2 | 4/2015 | Reeb et al. |
| 10,092,993 | B2 | 10/2018 | Knipping et al. |
| 2001/0052254 | A1* | 12/2001 | Easterbrook ............ B23P 9/025 72/325 |
| 2010/0107808 | A1 | 5/2010 | Alderton et al. |
| 2014/0260787 | A1 | 9/2014 | Kumar et al. |
| 2018/0036842 | A1 | 2/2018 | Alfred et al. |

FOREIGN PATENT DOCUMENTS

| | | | |
|---|---|---|---|
| DE | 102007028888 | 1/2009 | |
| DE | 102012003476 | 8/2013 | |
| DE | 112014000861 | 11/2015 | |
| DE | 102014222366 A1 * | 5/2016 | .............. C21D 9/30 |
| DE | 102015203487 | 9/2016 | |
| EP | 0530890 | 3/1993 | |
| EP | 0788419 | 8/1997 | |
| EP | 1034314 | 9/2000 | |
| EP | 1479480 | 11/2004 | |
| EP | 1612290 | 1/2006 | |
| EP | 1716260 | 11/2006 | |
| FR | 678070 | 3/1930 | |
| JP | S6088214 | 5/1985 | |
| JP | 1-122519 | 8/1989 | |
| JP | H042807 B2 * | 1/1992 | .............. F16C 3/08 |
| JP | 2016-169783 | 9/2016 | |
| JP | 2016169783 | 9/2016 | |
| SU | 427076 | 5/1974 | |
| WO | 2005090617 | 9/2005 | |
| WO | 2013120480 | 8/2013 | |

* cited by examiner

METHOD AND DEVICE FOR WORK-HARDENING A CRANKSHAFT

BACKGROUND OF THE INVENTION

The invention relates to a method for the work hardening of a crankshaft, which has connecting-rod bearing journals, main bearing journals and crank webs.

The invention also relates to an apparatus for the impact hardening of a crankshaft.

The invention also relates to a crankshaft.

Owing to the continuously progressing development and increase in performance of internal combustion engines and stringent emissions requirements placed on these, modern engines are consequently subjected to ever greater loading. For this reason, the motor industry places high demands with regard to strength inter alia on the crankshaft, which is subjected to high loading and which is important for the function of an internal combustion engine. Here, in terms of construction, there is often the demand for the crankshaft to be of low weight and for the space requirement to be small. For the design of the crankshaft, this means that an increase in the load capacity should be achieved not by increasing the cross section, that is to say by means of the section modulus of the crankshaft, but as far as possible by means of local internal compressive stress states. For this reason, modern crankshafts are produced using a wide variety of machining and heat treatment methods, such that the crankshafts can be subjected to increasingly higher levels of engine power.

Examples of such methods are thermal treatments, such as the surface hardening methods of induction and case hardening, laser hardening or nitriding, and strain hardening methods, such as deep rolling, shot peening or impact hardening. These are common and for the most part well-established methods, which are suitable for a wide variety of purposes.

With regard to examples of such methods, reference is made to the following documents: EP 1 479 480 A1, EP 0 788 419 B1, EP 1 612 290 A1, DE 10 2007 028 888 A1 and EP 1 034 314 B1.

Impact hardening in particular is an advantageous method for increasing the fatigue strength, in particular the bending fatigue strength and the torsional fatigue strength, of crankshafts. The increase in the fatigue strength is achieved here by virtue of impact forces being introduced into the crankshaft by cold working, preferably hammering by means of special impact tools, in the loaded regions at transitions in cross section and changes in cross section. As examples for such a process, reference is made to DE 34 38 742 C2 and EP 1 716 260 B1.

In order to prevent a disadvantageous introduction of shear stresses during the local hammering, it is proposed in DE 34 38 742 C2 that, at the time of the pressure pulse action, no relative movement be allowed to occur between the pulse-imparting body and the tool surface transversely with respect to the pulse direction. For this purpose, the feed motion during the introduction of internal compressive stresses by means of the impact tools should be performed in stepped fashion.

As a further development of this method, it has been proposed in EP 1 716 260 B1 for the crankshaft to be rotated continuously during the machining process, wherein, during the introduction of internal compressive stresses by means of the impacting of the impact tool against the crankshaft segment to be machined, the rotational movement of the crankshaft is stopped during the time in which the impact tool acts on the crankshaft. Here, the impact pressures are selected such that the rotational movement of the crankshaft is forcibly stopped by the impact movement.

For this purpose, however, complex components such as for example transmissions, clutches and/or spring systems are required within the drive device in order to prevent the drive device from being damaged by the "forced stops". Furthermore, the timing of the crankshaft and the introduction of the internal compressive stresses must be synchronized in a reliable manner in terms of a process. Here, the mechanical components required to ensure a robust installation are complex and expensive.

Although the crankshafts are commonly subjected to the abovementioned thermal treatments and/or work hardening processes, a further structural aspect can nevertheless lead to difficulties, in particular with regard to the torsional fatigue strength of the crankshaft. To permit a supply of oil during the operation of the crankshaft, the main bearing journals and the connecting-rod bearing journals are each equipped with oil bores. Such oil bores can adversely affect the robustness of the crankshaft. In the placement of oil bores, it must therefore be ensured that the load-bearing capacity of the crankshaft is not reduced beyond an admissible extent. In particular, owing to the high demands placed on the torsional strength of the crankshaft, designers are therefore restricted in terms of the dimensioning, positioning and/or alignment of the oil bores.

The problem addressed by the present invention is that of providing an improved method for the work hardening, and an apparatus for the impact hardening, of a crankshaft, in particular for the purposes of increasing the fatigue strength of the crankshaft.

Finally, the invention is also based on the object of providing a crankshaft which is improved, in particular with regard to its fatigue strength.

SUMMARY OF THE INVENTION

The dependent claims and the features described below relate to advantageous embodiments and variants of the invention.

In the method according to the invention for the work hardening of a crankshaft which has connecting-rod bearing journals, main bearing journals and crank webs, wherein the connecting-rod bearing journals and the main bearing journals have oil bores, provision is made whereby at least one oil bore end of one of the oil bores and/or at least one cylindrical portion of one of the oil bores is work-hardened.

The connecting-rod bearing journals and the main bearing journals will hereinafter in some cases also be referred to merely as "journals" for simplicity. Here, the expression "journals" may refer both to the connecting-rod bearing journals and to the main bearing journals, and also only to the connecting-rod bearing journals or only to the main bearing journals. Unless explicitly stated otherwise, all three variants are encompassed by the expression "journals" here.

The invention is particularly preferably suitable for increasing the fatigue strength of, for example, crankshafts with a length of 0.2 to 8 m or more and/or main and connecting-rod bearing journal diameters of 30 to 500 mm or more. The invention is however very particularly preferably suitable for increasing the fatigue strength of large crankshafts with a length of 1.5 to 8 m or more and/or main and connecting-rod bearing journal diameters of 100 to 500 mm or more.

An oil bore end may be a portion of the oil bore which extends into the oil bore to a certain depth proceeding from a mouth of the oil bore or proceeding from the transition of the oil bore into the running surface of the associated connecting-rod bearing journal or main bearing journal. The upper portion of the oil bore, or that portion of the oil bore which opens into the running surface, can thus be referred to as oil bore end. The oil bore end may comprise at least the mouth or the transition to the running surface of the journal. The oil bore end may however basically also extend into the oil bore to a depth of 50%, preferably to a depth of 25%, particular preferably to a depth of 10%, for example to a depth of 5% or 2%, proceeding from the mouth of the oil bore.

In the context of the invention, the oil bore end may also constitute merely a transition radius at the transition to the running surface. The oil bore end may also constitute a transition radius at the transition to the running surface, and an adjoining bevel or an adjoining countersink. The oil bore end may furthermore also constitute merely a bevel or a countersink of the oil bore; an optionally present transition radius at the transition to the running surface may accordingly also be assigned to the running surface within the context of the definition of the invention. The oil bore end may thus also extend into the oil bore to a certain depth proceeding from a bevel or countersink.

A cylindrical portion of the oil bore may be any portion of the oil bore within the crankshaft. The length of the cylindrical portion in the oil bore may be arbitrary, and may also encompass the entire length of the oil bore. It may in particular also be a portion which does not form part of the oil bore end. In the context of the definition according to the invention, the cylindrical portion of the oil bore comprises neither a transition radius nor a bevel or a countersink.

It is accordingly possible in the context of the invention for different regions of an oil bore to be work-hardened in each case independently or in any combinations:
 a transition radius at the transition to the running surface of the journal; and/or
 a bevel or countersink of the oil bore; and/or
 at least one cylindrical portion of the oil bore or an inner lateral surface of the oil bore at any depth.

The inventors have recognized that work hardening of at least one of the oil bore ends, and/or possibly of a part of or of the entire oil bore, can increase the robustness of the crankshaft. In this way, the crankshaft can possibly be even better adapted to the operation of the engine. In particular, the torsional fatigue strength of the crankshaft can be improved in the case of work hardening of at least one of the oil bore ends in accordance with the invention.

Furthermore, the inventors have recognized that work hardening of at least one cylindrical portion within an oil bore can also increase the robustness of the crankshaft. Here, it may in particular also be advantageous for only a cylindrical portion, for example a starting region and/or middle region of the oil bore, to be work-hardened, without hardening one of the oil bore ends, in particular without hardening a transition radius or a bevel/countersink of the oil bore.

Furthermore, with work hardening of the oil bore ends and/or cylindrical portions of the oil bore in accordance with the invention, the possibilities in the planning and design of the crankshaft with regard to the profile of the oil bores, the number of oil bores and/or the diameters of the oil bores are increased, because the torsional strength of the crankshaft is adversely affected to a lesser extent by the oil bores than is conventional in the prior art.

Where an oil bore of a connecting-rod bearing journal is referred to in the context of the invention, this may basically also be an oil bore of a main bearing journal, unless this is explicitly ruled out—and vice versa. An oil bore whose oil bore end and/or cylindrical portion is to be work-hardened may basically be present at any bearing point or running surface of the crankshaft, for example also in an input or output shaft of the crankshaft. Accordingly, the expressions "connecting-rod bearing journals" and "main bearing journals" may be reinterpreted by a person skilled in the art.

Depending on the crankshaft type used, provision may be made for multiple, a majority of, or all, connecting-rod bearing journals to have oil bores. Correspondingly, depending on the respective crankshaft type, provision may be made for multiple, a majority of, or all, main bearing journals to have oil bores.

Provision may furthermore be made whereby a journal (connecting-rod bearing journal or main bearing journal) has one, two or more oil bores. For example, in the case of crankshafts for V-configuration engines, it is common for two oil bores which are axially offset along the axis of rotation of the crankshaft to be provided in the connecting-rod bearing journals, in order for preferably two connecting rods to be attached. By contrast, in a crankshaft for an in-line engine, it is commonly the case that in each case only one oil bore is provided in the connecting-rod bearing journals.

The oil bores may run all the way through, or extend all the way through, the journals. That is to say, openings or mouths, and thus oil bore ends, may be provided on both sides of a journal (this applies in particular to the main bearing journals). The oil bores may however also end within the journal and thus be formed for example as blind bores (this applies in particular to the connecting-rod bearing journals).

The method according to the invention and the apparatus according to the invention may also be applied or used in the case of crankshafts which have already been machined beforehand using other methods in order to increase the fatigue strength characteristics thereof. For example, a crankshaft that has been hardened by induction hardening can thus also be retroactively improved by work hardening of the oil bore ends and/or of the cylindrical portions of the oil bores. It is likewise possible for unhardened (soft) and also nitrided, nitrocarburized or laser-hardened crankshafts to be improved by work hardening of the oil bore ends and/or of the cylindrical portions of the oil bores.

Provision may preferably be made whereby firstly the bearing points of the connecting-rod bearing journals and/or of the main bearing journals of the crankshaft are hardened by means of a known method, following which transition radii between connecting-rod bearing journals and crank webs and/or transition radii between main bearing journals and the crank webs of the crankshaft are work-hardened, preferably impact-hardened, and following which one, multiple or all oil bore ends of the oil bores and/or one, multiple or all cylindrical portions of the oil bores of the crankshaft are work-hardened. The machining sequence during the work hardening, in particular during the impact hardening, may be arbitrary, and it is in particular also possible for machining steps to be performed simultaneously.

In one refinement of the invention, provision may be made whereby the oil bore end or the oil bore ends and/or the one or more cylindrical portions are/is impact-hardened.

The invention will be described below substantially on the basis of the impact hardening of at least one oil bore end. This is however not to be understood as restrictive. In particular, it is also possible for at least one cylindrical portion of the oil bore to be impact-hardened in addition to or independently of the impact hardening of the oil bore end.

It is basically also possible for other work hardening methods to be provided for the hardening of the oil bore end and/or of the cylindrical portion, inter alia cold rolling, shot peening and/or hammering.

However, impact hardening in particular has proven to be an advantageous work hardening method, which can be implemented in a technically efficient manner, with regard to work hardening of oil bore ends and/or cylindrical portions of oil bores.

In one refinement, provision may be made whereby an impact force is introduced into the oil bore end and/or into the cylindrical portion by means of an impact head of an impact tool.

The introduction of an impact force can be understood to mean that the impact head of an impact tool, or a so-called "header" of an impact device, impacts against that region of the crankshaft which is to be hardened, in the present case an oil bore end or an internal wall of the cylindrical portion. Here, the impact is performed in targeted fashion at the desired impact position. Normally, an impact piston is used which transmits an intense pulse or an impulse (generated for example pneumatically, hydraulically and/or electrically) to the impact head.

Depending on the impact force, visible impact impressions of the impact head can form at the respective impact positions. The depth of the impact impressions and the quality or the depth effect of the introduced internal compressive stresses are in this case dependent on the selected impact force. The tool and the process parameters are preferably exactly coordinated with the respective crankshaft and, here, possibly to the oil bore and/or bearing point or running surface into which the oil bore end opens.

In particular, provision may be made whereby all oil bore ends, or cylindrical portions of the oil bores, which are to be hardened are impact-hardened in succession by means of one impact tool or by means of one impact device. Provision may however also be made whereby at least two or more oil bore ends and/or cylindrical portions of the oil bores are impact-hardened simultaneously, for which purpose multiple impact devices, multiple impact tools and/or multiple impact heads may be provided. The processing speed can be increased through simultaneous machining of multiple oil bore ends and/or cylindrical portions.

In one refinement of the invention, provision may be made whereby multiple, preferably a majority of, particularly preferably all, oil bore ends of the connecting-rod bearing journals and/or main bearing journals are work-hardened, in particular impact-hardened.

Furthermore, provision may be made whereby multiple, preferably a majority of, particularly preferably all, cylindrical portions of the oil bores of the connecting-rod bearing journals and/or main bearing journals are work-hardened, in particular impact-hardened.

The inventors have recognized that in particular work hardening of oil bore ends and/or cylindrical portions of oil bores of eccentrically running journals or highly loaded journals, that is to say in particular the connecting-rod bearing journals of the crankshaft, significantly increases the robustness of the crankshaft. Provision may therefore very particularly preferably be made whereby all oil bore ends and/or all cylindrical portions of oil bores of the connecting-rod bearing journals are work-hardened. It is also possible, if appropriate, for the work hardening of oil bore ends and/or of cylindrical portions of oil bores of the main bearing journals to be omitted in order to increase the processing speed of the method according to the invention. The work hardening is preferably realized by means of impact hardening.

In one refinement of the invention, provision may be made whereby the oil bore end has a transition radius at the transition to a running surface of the respective journal, wherein the transition radius is work-hardened, preferably impact-hardened.

In particular, the work hardening of the mouth of the oil bore, that is to say the front portion of the oil bore end that transitions into the running surface of the respective journal, has proven to be particularly efficient if the robustness of the crankshaft is to be improved. In general, the transition has a radius, a so-called transition radius. It is however also possible for any desired countersink to be provided in the region of the mouth of the oil bore end, for example a flat countersink or a profiled countersink, for example a conical profile countersink. The work hardening, preferably the impact hardening, of the oil bore end at the transition to the running surface is advantageously independent of the specific design of the transition of the respective journal.

Provision may also be made for work hardening of an oil bore end which transitions without a countersink or a transition radius into the running surface of the respective journal.

In one refinement, provision may also be made for the oil bore end to have a bevel, wherein the bevel is impact-hardened.

Depending on the specific application, provision may in particular be made for a transition radius at the transition to the running surface not to be hardened, in order to avoid impact impressions, introduced by impact hardening, in the region of the running surface, whereby improved running of the bearings can possibly be ensured. Hardening may for example be provided only starting at a bevel or a countersink, or else starting at the cylindrical portion.

Provision may also be made for the bevel and at least a part of the cylindrical portion of the oil bore to be work-hardened, in particular impact-hardened, but not the transition radius.

In one refinement, provision may furthermore be made whereby, during the impact hardening of one of the oil bore ends, a transition radius of the oil bore end or a countersink of the oil bore end is generated by the impact head.

Provision may be made whereby, at the same time as the impact hardening of an oil bore end, a countersink or a transition radius of the oil bore is generated in the first place by virtue of the impact tool, the impact head and/or the impact force being selected such that a corresponding impression of the impact head forms at the mouth of the oil bore.

In one refinement of the invention, provision may furthermore be made whereby two oil bore ends which are arranged axially offset (along the axis of rotation of the crankshaft) in the same journal are impact-hardened simultaneously by means of an impact tool which has two impact heads.

For this purpose, provision may in particular be made whereby the impulse of the impact piston is distributed preferably uniformly between the two impact heads by means of a deflecting unit.

If more than two oil bore ends are to be provided in one journal of the crankshaft, the number of impact heads of the impact tool may be correspondingly increased. It is thus preferably the case that all oil bore ends and/or cylindrical portions of oil bores of a journal are impact-hardened simultaneously.

Alternatively, provision may also be made whereby two or more oil bores formed in one journal are impact-hardened in each case individually, in particular by means of an impact tool which has only one impact head.

In one refinement of the invention, provision may be made whereby, for the alignment with one of the oil bore ends and/or during the impact hardening, the impact tool is supported by means of at least one support element on at least one of the crank webs.

To achieve the most optimum possible result, the impact tool can preferably be aligned exactly with the oil bore end or mouth of the oil bore. The impact force can particularly preferably be introduced along the central axis of the oil bore.

A corresponding support element, which is preferably formed from an elastic material or has an elastic material, can assist the exact alignment of the impact tool. The elastic material may for example be a plastic, in particular a soft plastic, or a rubber material. The support element may also be formed from a non-elastic material, for example brass or some other metal.

The support element is preferably designed so as to guide the impact tool between the two crank webs that surround a journal that is respectively to be impact-hardened. Here, the support element may preferably be arranged on the outer side of the impact tool and dimensioned such that the impact tool can be inserted between two crank webs and is supported by these. The extent of the impact tool together with the support element may thus preferably correspond, in an axial direction of the crankshaft, to the spacing (in an axial direction) between two crank webs that surround the journal that has the oil bore that is to be impact-hardened. The support element may be of single-part or multi-part form.

In a preferred refinement of the invention, provision may be made whereby the impact head for the impact hardening has a spherical surface.

The impact head may preferably be of substantially spherical form, in particular in the front region or at the front end of the impact head, which impacts against the crankshaft for the purposes of hardening. The impact head may however basically have any desired geometry, and may for example also be of oval, hemispherical or flat form.

A spherical surface of the impact head has however proven to be particularly suitable for the impact-hardening of the oil bore ends and/or of the cylindrical portions of the oil bores, because centering or alignment of the impact tool can be simplified in this way.

In one refinement, provision may be made whereby the impact head for the impact hardening has a shaping portion whose shape is adapted to the transition radius to be hardened and/or to the bevel and/or the profile/the design of the oil bore end, in particular in the mouth region.

The shaping portion may in particular correspond to a negative shape of the transition radius of the oil bore end. The impact head for the impact hardening may basically have a shaping portion whose shape is adapted to that portion of the oil bore end which transitions into the running surface of the respective journal.

In one refinement, provision may furthermore be made whereby, for the impact hardening of the oil bore end, use is made of impact heads with different diameters, in such a way that the impact heads penetrate to different depths into the oil bore end during the impact hardening.

Thus, for example in the case of impact heads with a spherical surface being used, the impact heads may have different sphere diameters.

Provision may be made whereby a spherical, hemispherical or partially spherical impact head has a diameter which is larger than the diameter of the oil bore, in particular is larger than the diameter of the oil bore by up to 1%, by at least 1%, preferably by at least 2%, particularly preferably by at least 5%, for example by at least 10%, 15%, 20% or even by at least 50%.

In one refinement, provision may be made whereby a changeover device is used to change over the impact heads.

In particular, a changeover device with a magazine may be provided in order to exchange the impact heads and/or the impact tool and/or the impact device in order to vary the diameter of the impact head used between two impacts against the same oil bore end.

A changeover device for exchanging impact heads of an impact tool may be designed for example as a rotatable drum.

In one refinement of the invention, provision may be made whereby, for the work hardening of the oil bore end, a spherical body is pushed through at least one portion of the oil bore.

In this way, the internal walls of the oil bore, in particular in the region of the oil bore end, can also be work-hardened. To achieve effective work hardening, it is advantageous if the spherical body is slightly larger than the diameter of the oil bore in order to effect the desired deformation that leads to the work hardening.

The spherical body may be an impact head of an impact tool. The impact tool that may basically be used for the impact hardening may thus also be used for the work hardening of the internal walls of the oil bore, if the impact tool is designed such that it can penetrate with the impact head into the oil bore. In particular if the spherical body is fastened to the impact tool while being pushed through the oil bore, as exact as possible an alignment of the impact tool along the central axis of the oil bore is advantageous.

After being pushed into the portion of the oil bore, the spherical body is preferably removed from, for example pulled out of, the oil bore again.

In one refinement, provision may be made whereby the spherical body is pushed in pulsed fashion or uniformly into the at least one portion of the oil bore.

The spherical body may for example be pushed into the oil bore to an ever greater depth (and possibly pulled out again) by means of successive impulses that are generated for example by means of the impact piston of an impact device. The spherical body may however also be introduced into the oil bore as far as its final depth (and possibly pulled out again) by means of a single pushing or thrusting movement.

The depth to which the oil bore is preferably work-hardened (or the depth of the oil bore end) may be determined on the basis of simulations and/or calculations and/or series of tests of the respective crankshaft type. The at least one cylindrical portion of the oil bore that is to be hardened may also be determined on the basis of simulations and/or calculations and/or series of tests of the respective crankshaft type.

Provision may also be made for the spherical body to be pushed yet further into the oil bore beyond the extent of the oil before end, for example to also be pushed fully into the oil bore.

The connection of the oil circuit of the crankshaft to the oil circuit of the engine block is commonly produced via the centrally rotating main bearing journals. Proceeding from the main bearing journals, oil is distributed to the connecting-rod bearing journals. For this purpose, in general, connecting bores are provided which connect the oil bores of the main bearing journals to the oil bores of the connecting-rod bearing journals, in order that the eccentrically running connecting-rod bearing journals are also supplied with oil.

In one refinement of the invention, provision may be made whereby the spherical body is pushed into the oil bore of one of the connecting-rod bearing journals and passes from there directly, or via a connecting bore, to an oil bore of one of the adjoining main bearing journals, wherein the connecting bore and/or the oil bore of the main bearing journal have an inner diameter which is at least as large as the outer diameter of the spherical body.

Since the spherical body for the work hardening must preferably be slightly larger than the diameter of the oil bore itself, this gives rise to the challenge of removing the spherical body from the oil bore again after the work hardening. If the oil bore runs all the way through the journal, the spherical body can possibly be pushed out of the oil bore again at the rear side of the journal. If the oil bore does not extend all the way through the journal, provision may be made for the spherical body to be pulled out of the oil bore again in a reverse direction when the work hardening has been completed, though this can lead to problems.

The inventors have now developed a method with which the spherical body is firstly pushed through the oil bore of the connecting-rod bearing journal until it impacts against a corresponding connecting bore or an oil bore of an adjoining main bearing journal. If the connecting bore or the oil bore of the main bearing journal have a greater diameter than the spherical body, the spherical body can thus be removed again via an adjoining main bearing journal, because the spherical body can roll through the connecting bore or the oil bore of the main bearing journal and fall out of the mouth of the oil bore of the main bearing journal.

Provision may also be made for the spherical body to be removed again in some other way after being pushed into the oil bore, for example by virtue of pressure being built up in the oil supply channels, for example by pneumatic or hydraulic means, whereby the spherical body can be pushed out of the portion of the oil bore again.

Provision may be made for the spherical body to be pushed into the portion of the oil bore by a plunger which is not fixedly connected, or which is connected loosely, to the spherical body.

Provision may also be made for the spherical body to initially be fixedly connected to the plunger and to be released again only as or after the spherical body is being or has been pushed fully into the oil bore. As mentioned above, the spherical body may also be an impact head of an impact tool. Here, the impact tool may be designed such that the impact head can be released or ejected.

In one refinement of the invention, provision may be made whereby the impact tool is introduced with at least one impact head into the oil bore, following which, for the work hardening of the oil bore end and/or of the at least one cylindrical portion of the oil bore, the at least one impact head is pushed radially out of the impact tool and against an internal wall of the at least one cylindrical portion of the oil bore and/or against the internal wall of the oil bore end.

Provision may thus be made of an impact tool of radially telescopic design, or a deflecting tool with impact heads that can be advanced radially in telescopic fashion.

In this way, it is advantageously possible for any portion (or any portions) within the oil bore to be work-hardened, preferably impact-hardened. For this purpose, the impact tool can be pushed into the oil bore to the desired depth, following which the at least one impact head is pressed against the internal wall of the oil bore for the purposes of hardening the oil bore.

It is basically pointed out that the impact tool described in this section may also be used for the work hardening, preferably impact hardening, of the transition radius and/or of the bevel, even though, for the purposes of improved understanding, the impact tool is described above and below only with regard to the machining of the cylindrical portion.

In particular, provision may be made whereby the at least one impact head is pushed radially outward orthogonally with respect to a central axis of the impact tool or the central axis of the oil bore. The at least one impact head may however be pushed radially outward at any angle relative to the central axis of the impact tool or of the oil bore.

In order to harden the internal surface or the internal wall of the oil bore as completely and uniformly as possible in the region of the cylindrical portion, provision may be made whereby the impact tool is rotated in the oil bore about the central axis of the oil bore in continuous or periodic or clocked fashion during the hardening process. Provision may furthermore be made whereby the impact tool is moved axially along the central axis of the oil bore in continuous or periodic or clocked fashion during the hardening process.

Provision may be made whereby two, three, four, five, six or even more impact heads are used for hardening the cylindrical portion. The impact heads may preferably be arranged uniformly around a central axis of the impact tool in order to uniformly harden the internal wall of the oil bore proceeding from the central axis of the oil bore. In the case of more than one impact head being used, a rotation of the impact tool in the oil bore may possibly be omitted, or the required angle range for the rotation may be reduced.

At least one support device may be provided in order to support the impact tool within the oil bore on the internal wall thereof, in particular in the case of only one impact head being used. The support device may be formed from a material described in the context of the support element mentioned above.

Provision may furthermore be made for multiple axial planes with in each case at least one impact head to be provided in the impact tool, for example two, three, four, five, six or even more planes, in order to increase the processing speed during the hardening of a correspondingly long cylindrical portion or partially or entirely avoid the need for an axial movement of the impact tool during the hardening.

Provision may be made for the at least one impact head to be pressed against the internal wall with a continuous pressure or, for the impact hardening, with an impacting action.

In one refinement, provision may be made for the at least one impact head to be pushed out of the impact tool hydraulically, pneumatically or electromechanically.

An electromechanical embodiment can be realized in particular using an electromechanical actuator which converts one or more electrical signals into a mechanical movement or a correspondingly suitable physical variable.

Any combination of a hydraulic, pneumatic, electrical and/or mechanical configuration may also be provided.

In an alternative refinement, provision may be made whereby the at least one impact head is pushed radially out of the impact tool mechanically using at least one wedge or at least one ball screw drive.

For example, a ball roller spindle may be provided on which, at both sides, nuts are provided in the manner of impact heads, which can be moved on the ball roller spindle in the direction of the internal wall of the oil bore. In particular, a conical ball roller spindle may be provided which can be driven by means of a spindle which is introduced axially into the oil bore.

In one embodiment of the invention, provision may be made whereby, for the impact hardening of one of the oil bore ends and/or of one of the cylindrical portions of the oil bores, the crankshaft is firstly rotated by means of a drive device along a direction of rotation into an impact position, following which an arresting device is used in order to arrest the crankshaft in the impact position, following which the impact force is introduced into the oil bore end and/or into the cylindrical portion of the oil bore by means of the impact tool.

In this way, (parasitic) shear stresses can be substantially, if not even entirely, prevented. It is furthermore possible to prevent the crankshaft from rotating in an undesired manner as a result of the impact in the case of an inexactly oriented impact tool.

By means of the arresting device, the impact force can be introduced in a particularly targeted manner into the desired region. This is possible because the crankshaft cannot rotate along or counter to the rotational direction in an undesired manner upon the impacting of the impact tool.

By means of the arresting device, it is possible in particular to ensure highly precise working or impact hardening. The impact positions and also the impact spacings can be implemented in a very particularly targeted manner and with small tolerances.

An arresting device may be a device which arrests the crankshaft in preferably non-positively locking and/or positively locking fashion, or engages with this aim into the drive train or into the apparatus. A non-positively locking arresting means is preferably provided, wherein the arresting force is selected such that a rotation of the crankshaft during the introduction of the impact force is prevented or at least suppressed.

The arresting device may be a hydraulically, pneumatically and/or electrically operated arresting device.

The arresting device preferably has one or more brake shoes, for example two brake shoes, three brake shoes, four brake shoes or more brake shoes.

The arresting device is preferably attached to the workpiece drive unit. For example, the arresting device may be arranged on a jaw chuck or a clamping flange, a fastening flange or a face plate of the workpiece drive device, or directly on the motor or the drive.

In particular in the case of the impact-hardening of obliquely running oil bores, the use of an arresting device can be advantageous in order to prevent the crankshaft from rotating in the event of an oblique impact against the oil bore.

Proceeding from the respective running surface of the journal, the oil bores commonly run perpendicularly through the journal or toward the central axis of the corresponding journal. The oil bores may however also run obliquely through the respective journal, for example if an oil bore of a connecting-rod bearing journal is to be connected to the oil bore of a main bearing journal without an additional connecting bore.

The method according to the invention is preferably used for the work-hardening (in particular for the impact-hardening) of a perpendicularly running oil bore. The invention may however also be used for the hardening of obliquely running oil bores, wherein the impact tool may then preferably likewise act perpendicularly on the oil bore end. It is however in this case or basically also possible for the impact tool to be inclined obliquely. The central axis of the impact tool is preferably aligned coaxially with respect to the central axis of the oil bore to be hardened, in order that the impact force that is introduced also runs along the central axis of the oil bore.

For this purpose, it may be necessary to use supporting aids in order to prevent slippage or buckling of the impact tool.

In one embodiment of the invention, provision may be made whereby, for the operation of the drive device, closed-loop position control is used in order to rotate the crankshaft into the impact position, wherein the crankshaft is rotated preferably in stepped or clocked fashion.

With a closed-loop position controller, a point-to-point movement of the crankshaft can thus be achieved. For example, an open-loop position controller may be used in order to rotate the crankshaft in stepped or clocked fashion from one impact position to the next impact position. In the simplest case, an open-loop PTP controller or point controller may be provided for this purpose.

The drive device may comprise a motor, in particular an electric motor. The electric motor may basically be any electric motor, for example a three-phase motor (in particular a three-phase asynchronous machine), an AC motor, a DC motor or a universal motor.

A stepper motor may preferably be used.

It is also possible for a two-part drive device to be provided, in the case of which, for example, a motor is provided at each end of the crankshaft, that is to say a synchronous drive or bilateral drive of the crankshaft.

In one embodiment of the invention, provision may be made whereby the controller of the drive device and the controller of the arresting device are synchronized with one another such that the arresting device arrests the crankshaft only when the crankshaft is at a standstill in the impact position.

The arresting device may basically also, in the case of a corresponding design, for example in the case of a design based on non-positive locking, be used for braking the rotational movement of the crankshaft. It is however particularly preferable to use the arresting device only for arresting the crankshaft in the impact position, whereby the dynamics or rotation of the crankshaft is influenced only by the drive device. That is to say, a torque that leads to an acceleration of the crankshaft (or to braking) should preferably be introduced exclusively by the drive device. For example, the controller of the drive device (for example a closed-loop position controller) and/or the controller of the arresting device can be of particularly simple construction. It may thus suffice to merely synchronize the points in time at which the drive device and arresting device act on the crankshaft through corresponding time management. The drive device and the arresting device thus preferably do not act on the crankshaft simultaneously.

In one embodiment of the invention, provision may furthermore be made whereby the controller of the arresting device and the controller of the at least one impact tool are synchronized with one another such that the at least one impact tool introduces the impact force into the at least one oil bore end and/or into the cylindrical portion of the oil bore of the crankshaft only when the crankshaft has been arrested in the impact position.

Undesired shear stresses can be prevented entirely in this way.

The synchronization of the controllers of the drive device, arresting device and/or of the at least one impact tool may also be performed such that the points in time or time ranges in which the individual components act on the crankshaft at least partially overlap. Faster timing of the entire method can be achievable in this way.

In one embodiment of the invention, provision may be made whereby the drive device is designed as a direct drive.

A drive device without a clutch is preferably provided.

In the present case, a direct drive is to be understood to mean drives in the case of which the motor, preferably an electric motor, and the driving shaft are connected or coupled directly or without a transmission ratio. In particular, a transmission can be omitted.

When using the method according to the invention, it is also preferably possible to omit a clutch, in particular a slipping clutch. A slipping clutch, used inter alia for protecting components, is provided for example in the method according to EP 1 716 260 B1 in order that the drive device or the apparatus is not damaged upon the forced stop of the crankshaft as a result of the impacting of the impact head. Such damage is ruled out in the case of the method described here, whereby the slipping clutch can be rendered unnecessary.

In this way, the construction of the drive device is very particularly simple and thus economical.

In one embodiment of the invention, provision may be made in particular whereby the arresting device and the drive device are arranged separately from one another.

The arresting device is preferably not designed as a brake arrangement within the drive device, which may be required for example for the closed-loop position control. Normally, in a drive device that comprises an electric motor and performs point-to-point operation by means of a closed-loop position controller, no brake arrangement is provided in any case, because the torques are generated through closed-loop voltage and/or current control of the electric motor. Should the drive device however comprise a conventional brake device, provision may possibly be made whereby the arresting device according to the invention is provided in addition to this and is designed as an assembly independent thereof.

The arresting device may basically also be arranged separately within the drive device. In this case, too, these are preferably mutually independent components which are spatially separate and/or functionally independent.

In an alternative variant, which is not preferred, a brake device of the drive device may be used. For this purpose, said brake device must be suitably designed in order that the crankshaft does not rotate during the introduction of the impact force.

In one embodiment of the invention, provision may furthermore be made whereby the arresting device arrests the crankshaft indirectly by virtue of the arresting device arresting a rotatable fastening device, preferably a fastening flange or a clamping flange of the fastening device, to which flange or fastening device the crankshaft is fixed.

Instead of the fastening flange or in addition to the fastening flange, the fastening device may also comprise a face plate or some other clamping means.

In particular, a face plate with multiple clamping jaws, for example two, three, four, five, six or more clamping jaws, may be provided. In this way, crankshaft types with different diameters can be fixed.

The crankshaft is, for the processing thereof, commonly rotatably fixed by means of a fastening device to a drive shaft.

In order to arrest the crankshaft in its impact position, the arresting device may basically engage at any desired position that is mechanically coupled to the drive device or to the crankshaft. For example, the arresting device may engage on the crankshaft itself, may engage within the drive device for example on the drive shaft, may engage outside the drive device for example on the drive shaft, or may particularly preferably engage on the fastening device, in particular on a fastening flange or on a face plate or some other clamping means.

In one embodiment, provision may be made in particular whereby the arresting device engages on the fastening device or on the fastening flange or on the face plate or on the clamping flange in the region of an outer circumference.

By virtue of the fact that the arresting device engages in the region of an outer circumference of a plate or shaft, the arresting forces which must be imparted, or which are required, can be lower. Depending on the radial position of the arresting device in relation to the axis of rotation of the drive shaft, correspondingly less force is required to block a torsional moment the greater the radial spacing to the axis of rotation is. It is particularly advantageous here if the arresting device engages only when the crankshaft is already at a standstill in the impact position.

The arresting device may basically also engage on multiple locations within the apparatus. For example, provision may be made whereby the arresting device engages on in each case one suitable location in the region of both ends of the crankshaft, for example on fastening flanges situated there.

A support in the manner of a tailstock may also be provided in order to rotatably support or fix the crankshaft at its end averted from the drive device.

The arresting device may then for example engage in the region of the drive device or drive shaft and/or in the region of the support. It is preferable in this case, too, for the arresting device to engage on the fastening device, preferably a fastening flange, as described.

In one embodiment of the invention, provision may be made whereby the arresting device is designed to prevent rotation of the crankshaft counter to and/or in the direction of rotation of the crankshaft.

The impact pressures that are implemented by the impact piston to generate the impact force may—depending on the operating mode—amount to between 10 and 300 bar, preferably between 30 and 180 bar, and particularly preferably between 50 and 130 bar.

The temperature in the region of the crankshaft segment or transition radius to be machined should preferably be no higher than 65° C.; values between 12° C. and 25° C. are preferred.

In the method according to the invention for the work hardening of a crankshaft, in addition to the work hardening of the at least one oil bore end and/or the at least one cylindrical portion of the oil bore, it is possible for impact hardening of transition radii of the crankshaft, in particular of transition radii between connecting-rod bearing journals and crank webs and/or transition radii between main bearing journals and the crank webs of the crankshaft, to be provided before, after or at the same time as the hardening of the at least one oil bore end and/or the at least one cylindrical portion of the oil bore.

Features and method steps that have been described above with regard to the impact hardening of the oil bore ends or of the cylindrical portions may also, unless this is technically ruled out, be provided for the impact hardening of the transition radii between connecting-rod bearing journals and crank webs and/or between main bearing journals and crank webs.

In one embodiment of the invention relating to the impact hardening of the transition radii between connecting-rod bearing journals and crank webs and/or between main bearing journals and crank webs, the at least one impact tool can perform an impact movement, or introduce the impact force, with a periodicity, preferably with a timing or impact frequency of 0.5 Hz to 30 Hz, particularly preferably with a timing of 0.5 Hz to 5 Hz and very particularly preferably with a timing of 0.5 Hz to 3 Hz.

Other timings, for example also impact frequencies between 0.1 Hz and 50 Hz, may self-evidently also be provided, but the values stated above are very particularly suitable.

The crankshaft commonly has transition radii at all transitions or changes in cross section. This applies in particular to changes in cross section between bearing journals and crank webs. Transition radii may however also be provided for any other changes in cross section, in particular for changes in cross section at the end sections of the crankshaft, in particular at a transition to a flange, a disk or a shaft etc. A transition radius of the crankshaft whose fatigue strength is to be improved thus need not imperatively be present between a connecting-rod bearing journal and a crank web or a main bearing journal and a crank web, but may rather be arranged at any location of the crankshaft. The expressions "connecting-rod bearing journal", "main bearing journal", "flange", "journal" and/or "crank web" may be reinterpreted accordingly by a person skilled in the art.

The crankshaft may have various types of transition radii, for example fillets, for example in a basket arch shape, or also undercut radii or radii with transitions. The transition radii may for example transition tangentially into the bearing journal points or running surfaces of the main and connecting-rod bearing journals.

This also applies for transitions to flanges, journals and other geometrical changes in cross section both for tangential and undercut radii.

In one embodiment, provision may be made whereby the impact hardening of the transition radii between connecting-rod bearing journals and crank webs and/or between main bearing journals and crank webs is performed such that the impact impressions of an impact head of the impact tool overlap in a defined manner along the respective transition radius running in annularly encircling fashion around the connecting-rod bearing journal or main bearing journal.

In particular if the impact impressions of an impact head along the respective transition radius of the crankshaft running in annularly encircling fashion around the journal are intended to overlap, that is to say if the impact positions are closely spaced apart, then it is necessary for the impact force to be introduced in a highly precise and targeted manner. Without the above-described arresting device, this is difficult because, during the introduction of the impact force, the crankshaft would at least partially rotate back from one impact position into the previous impact position if the impact head penetrates into the impact impression of the previous impact. Since it has been found that a particularly effective increase in fatigue strength or flexural fatigue strength and torsional fatigue strength can be generated by means of overlapping impact impressions or closely arranged and exactly defined impact positions, the use of an arresting device is particularly advantageous in combination with the introduction of closely positioned and/or precise impact spacings, in particular such that the impact impressions overlap or intersect.

The invention also relates to an apparatus for the impact hardening of a crankshaft, wherein the crankshaft has connecting-rod bearing journals, main bearing journals and crank webs, and wherein the connecting-rod bearing journals and the main bearing journals have oil bores.

According to the invention, with regard to the apparatus, provision is made whereby an impact force is introduced by means of an impact head of an impact tool at least into an oil bore end of one of the oil bores and/or into at least one cylindrical portion of one of the oil bores.

Features that have already been described in conjunction with the method according to the invention are self-evidently also advantageously implementable for the apparatus according to the invention, and vice versa. Furthermore, advantages that have already been mentioned in conjunction with the method according to the invention can also be understood as relating to the apparatus according to the invention, and vice versa.

In one embodiment of the apparatus, a drive device may furthermore be provided in order to rotate the crankshaft into an impact position. Furthermore, an arresting device may be provided in order to arrest the crankshaft in the impact position, wherein, furthermore, at least one impact tool is provided in order, in the impact position, to introduce an impact force into the at least one oil bore end and/or into the at least one cylindrical portion.

The apparatus may furthermore be designed to introduce impact forces also into transition radii between connecting-rod bearing journals and crank webs and/or transition radii between main bearing journals and the crank webs of the crankshaft, and/or transitions to flanges, journals and other geometrical changes in cross section of the crankshaft both for tangential and undercut radii.

An open-loop and/or closed-loop control device may be provided which comprises the controllers of the arresting device, of the drive device and/or of the at least one impact tool.

The open-loop and/or closed-loop control device may be designed as a microprocessor. Instead of a microprocessor, provision may also be made of any other device for implementing an open-loop and/or closed-loop control device, for example one or more arrangements of discrete electrical components on a circuit board, a Programmable Logic Controller (PLC), an Application-Specific Integrated Circuit (ASIC) or some other programmable circuit, for example also a Field Programmable Gate Array (FPGA), a Programmable Logic Arrangement (PLA) and/or a commercially available computer.

The invention also relates to a computer program with program code means for carrying out an above-described method when the program is executed on an open-loop and/or closed-loop control device, in particular on a microprocessor.

Some of the components of the apparatus according to the invention may basically correspond in terms of their construction to the apparatus according to EP 1 716 260 B1, for which reason the content of disclosure of EP 1 716 260 B 1 is, in its entirety, integrated into the present disclosure by reference.

The invention also relates to a crankshaft produced in accordance with a method described above.

The crankshaft according to the invention differs from conventional crankshafts in particular by the fact that its oil bore ends and/or the cylindrical portions of the oil bores have been work-hardened, preferably impact-hardened.

If, furthermore, the transition radii between connecting-rod bearing journals and crank webs and/or the transition radii between main bearing journals and the crank webs of the crankshaft have been impact-hardened, this can give rise to a characteristic hardening of the crankshaft, in particular if an arresting device is used and the impact spacings and thus the impact impressions of the individual impacts overlap.

BRIEF DESCRIPTION OF THE FIGURES

Exemplary embodiments of the invention will be described in more detail below on the basis of the drawing.

The figures each show preferred exemplary embodiments, in which individual features of the present invention are illustrated in combination with one another. Features of an exemplary embodiment are also implementable separately from the other features of the same exemplary embodiment, and may accordingly be readily combined by a person skilled in the art with features of other exemplary embodiments in order to form further meaningful combinations and sub-combinations.

In the figures, functionally identical elements are denoted by the same reference designations.

In the figures, in each case schematically:

FIG. 1 shows an overall view of an apparatus according to the invention for carrying out the method in a first embodiment;

FIG. 2 shows an exemplary flow diagram of the method according to the invention;

FIG. 3 shows a perspective view of a part of the apparatus according to the invention for carrying out the method in a second embodiment;

FIG. 4 shows an impact device with an impact tool and an impact head with spherical surface in an enlarged illustration as per detail "A" from FIG. 1;

FIG. 5a shows an impact device with an impact tool with two impact heads, each with spherical surface, during the hardening of straight-running oil bores;

FIG. 5b shows the impact device of FIG. 5a during the hardening of obliquely running oil bores;

FIG. 6 shows a detail of a crankshaft with exemplary oil bores and with a connecting bore between a perpendicularly running oil bore of a connecting-rod bearing journal and a perpendicularly running oil bore of a main bearing journal;

FIG. 7 shows an exemplary oil bore end of an oil bore and a schematic illustration of the impact hardening using impact heads of different size;

FIG. 8 shows an example of impact hardening using an impact head which has a shaping portion;

FIG. 9 shows an example of impact hardening using an impact head, wherein a transition radius or a countersink is simultaneously introduced into the oil bore end by the impact head;

Figure 10:
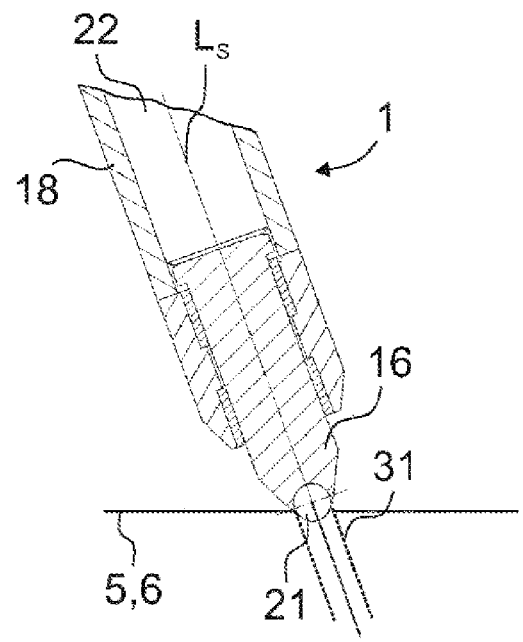
Figure 11:
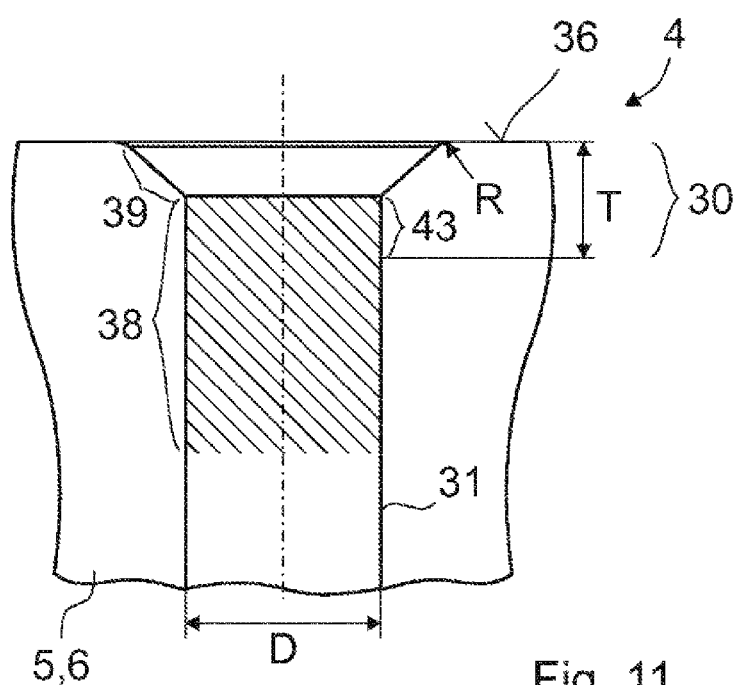
Figure 12:
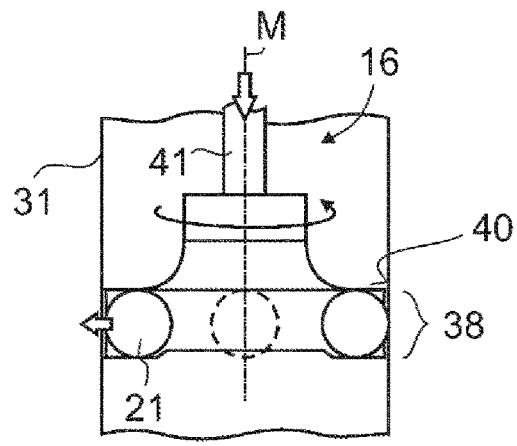
Figure 13:
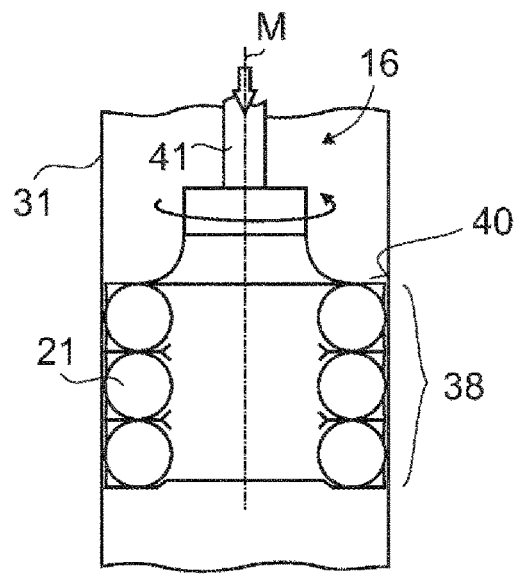
Figure 14:
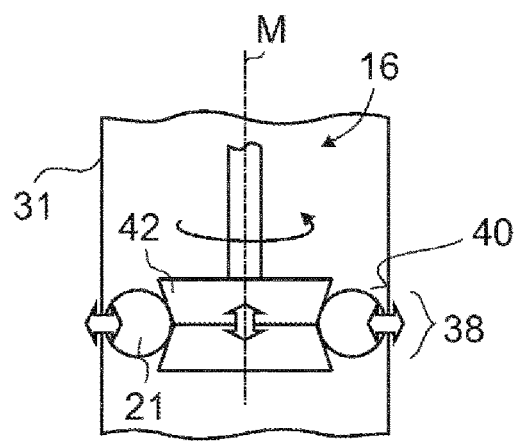

FIG. 10 shows an obliquely inclined impact tool in a further embodiment for the hardening of an obliquely running oil bore;

FIG. 11 shows an oil bore in a sectional illustration with a transition radius, a bevel and a cylindrical portion;

FIG. 12 shows a pneumatic/hydraulic or electromechanical impact tool for the work hardening of a cylindrical portion of an oil bore;

FIG. 13 shows a pneumatic/hydraulic or electromechanical impact tool for the work hardening of a cylindrical portion of an oil bore with impact heads arranged in multiple height planes; and FIG. 14 shows an impact tool for the work hardening of a cylindrical portion of an oil bore by means of a wedge and multiple impact heads.

DETAILED DESCRIPTION OF THE INVENTION

The apparatus illustrated in an overall view in FIG. 1 basically corresponds in terms of its construction to the apparatuses as per DE 34 38 742 C2 and EP 1 716 260 B1 with an impact device 1, for which reason only the important parts, and the differences in relation to the prior art, will be discussed in more detail below.

In the exemplary embodiment, the method according to the invention for work hardening will be illustrated on the basis of an impact hardening process. This is however not to be understood as restrictive. The method according to the invention may also be realized using some other work hardening process.

The apparatus has a machine bed 2 and a drive device 3. The drive device 3 is used to move or rotate a crankshaft 4 along a direction of rotation into an impact position.

The crankshaft 4 has connecting-rod bearing journals 5 and main bearing journals 6, between which crank webs 7 are arranged in each case. Transition radii 8 (see FIGS. 4 to 6) are formed between connecting-rod bearing journals 5 and crank web 7 and between main bearing journals 6 and crank web 7, or generally between transitions in cross section of the crankshaft 4.

At that side of the crankshaft 4 which faces toward the drive device 3, there is provided a fastening device 9 which has a clamping disk or a fastening flange 10. On that side of the crankshaft 4 which is averted from the drive device 3, a support 11 preferably in the manner of a tailstock is provided, which has a further fastening device 9 for the purposes of rotatably receiving or rotatably fixing the crankshaft 4. Optionally or in addition to the support 11, a back rest may be provided which is positioned at a rotationally symmetrical location.

In accordance with one embodiment of the invention, an arresting device 12 is provided, which engages in the region of an outer circumference of the fastening device 9. Basically, the arresting device 12 may be arranged at any desired location within the apparatus in order to apply an arresting force to an output shaft of the drive device 3, or to an input shaft 13, which in the present case is identical to said output shaft, of the fastening device 9, and thus to the crankshaft 4. The arresting device 12 may also engage on multiple locations of the apparatus. By way of example, a second part of the arresting device 12 in engagement with the fastening device 9 in the region of the support 11 is illustrated by dashed lines.

The arresting device 12 is based for example on a non-positive arresting action using a merely schematically illustrated brake shoe arrangement 14.

Figure 1:
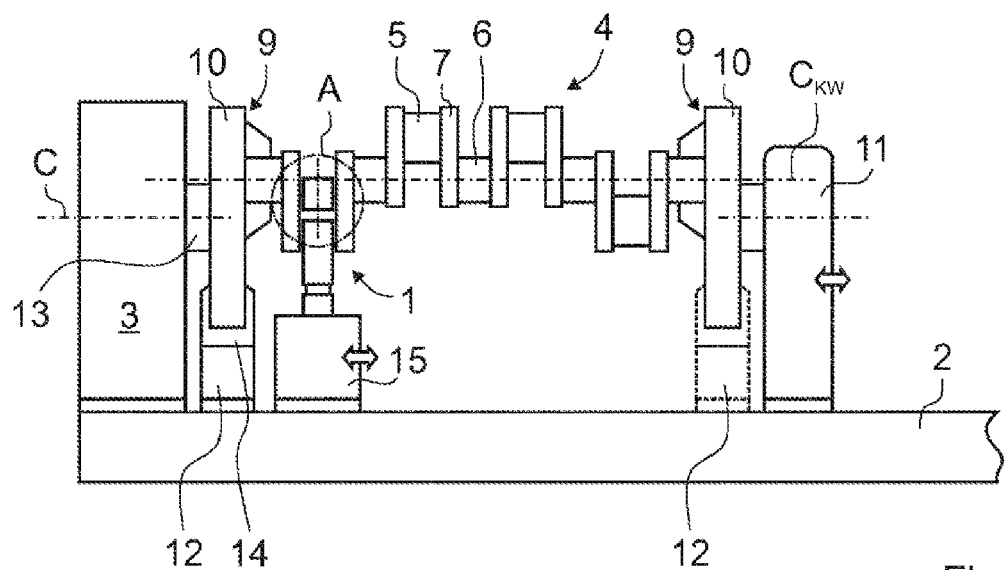

The impact device 1 illustrated in FIG. 1 is an impact device 1 for the impact hardening of at least one oil bore end 30 (see in particular FIG. 7 to FIG. 9) of an oil bore 31 (see FIG. 4 to FIG. 10) and/or of at least one cylindrical portion 38 (see FIG. 11) of one of the oil bores 31. The illustrated impact device 1 may however also be designed for the impact hardening of at least one transition radius 8 between a connecting-rod bearing journal 5 and a crank web 7 and/or at least one transition radius 8 between a main bearing journal 6 and a crank web 7 of a crankshaft 4. It is also possible for multiple impact devices 1 to be provided, wherein at least one of the impact devices 1 is designed for hardening the oil bore ends 30 and/or the cylindrical portion 38 and at least one further impact device is designed for hardening the transition radii 8 between connecting-rod bearing journals 5 and crank web 7 and/or between main bearing journals 6 and crank web 7.

For the functional principle of the invention, an arresting device 12 is basically not necessary but may be advantageous, for example also for the impact hardening of obliquely running oil bores 31 in order to prevent rotation of the crankshaft 4 during the introduction of the impact force.

FIG. 1 furthermore illustrates a displacement and adjustment device 15 which is provided for moving the impact device, which is illustrated by way of example, along the longitudinal axis of the crankshaft in order to correspondingly position the impact device 1 at the connecting-rod bearing journal 5 or the main bearing journal 6 whose oil bore or oil bore end is to be impact-hardened.

Figure 2:
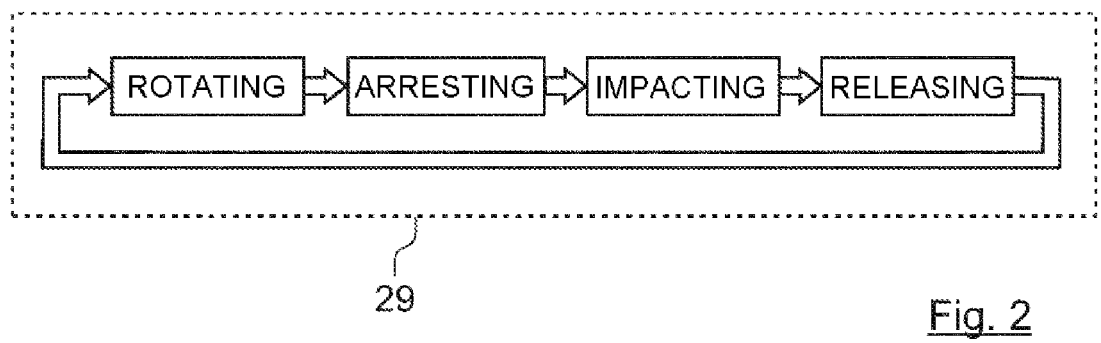

FIG. 2 shows an exemplary flow diagram for an exemplary method which may be composed of four steps (rotating, arresting, impacting, releasing). The method steps of arresting and of releasing are in the present case optional but advantageous.

For the operation of the drive device 3, which preferably comprises an electric motor, closed-loop position control may be used in order to rotate the crankshaft 4 into the respective impact position, wherein the crankshaft 4 is rotated preferably in stepped or clocked fashion.

After the crankshaft 4 has been rotated by the drive device 3 into the impact position, the crankshaft 4 is initially arrested in the impact position by the optional arresting device 12.

Subsequently, by means of at least one impact tool 16 (see FIG. 4, FIGS. 5a/5b and FIG. 10), an impact force is introduced into at least one oil bore end 30 of an oil bore 31 of the crankshaft 4 and/or into at least one cylindrical portion 38 of an oil bore 31 of the crankshaft 4. Additionally, an impact force may also be introduced into at least one transition radius 8 of the crankshaft 4 by means of the same or at least one (further) impact tool.

Preferably, the controller of the drive device 3 and the controller of the arresting device 12 are synchronized with one another such that the arresting device 12 arrests the crankshaft 4 only when the crankshaft 4 is at a standstill in the impact position.

Furthermore, it is also possible for the controllers of the arresting device 12 and of the at least one impact tool 16 (or of the at least one impact device 1) to be synchronized such that the at least one impact tool 16 introduces the impact force into the oil bore end 30 or into the cylindrical portion 38 of the crankshaft 4 only when the crankshaft 4 has been arrested in the impact position. The arresting of the crankshaft 4 is subsequently released again.

The method may subsequently be repeated as often as desired for the same oil bore end 30 or the same oil bore 31, for example also through slight modification of the impact position and/or of the impact angle.

After an oil bore end 30 and/or a cylindrical portion 38 has been impact-hardened in the desired manner, the impact tool 16 or the entire impact device 1 can be moved to the next oil bore end 30 to be hardened and/or to the next cylindrical portion 38 to be hardened (of the same or another oil bore 31), following which the method comprising the steps "rotating", "arresting" (optional), "impacting" and "releasing" (optional) can be repeated.

Similarly, a controller or a sequence for the impact hardening of transition radii 8 between connecting-rod bearing journals 5 and crank webs 7 and/or between main bearing journals 6 and crank webs 7 may be provided. A common controller may also be provided.

The at least one impact tool 16 or the at least one impact device 1 may introduce the impact movement or the impact force with a periodicity, for example with a timing and/or impact frequency of 0.1 Hz to 50 Hz, preferably with a timing and/or impact frequency of 0.3 Hz to 10 Hz, particularly preferably with a timing and/or impact frequency of 0.5 Hz to 5 Hz and very particularly preferably with a timing and/or impact frequency of 0.5 Hz to 3 Hz. Provision may be made here whereby multiple (at least two) impacts are introduced into an oil bore 31 with the stated impact frequency or, in the case of the hardening of transition radii 8 between connecting-rod bearing journals 5 and crank webs 7 or transition radii 8 between main bearing journals 6 and crank webs 7, the impact position is changed with the stated timing, following which in each case one or more impacts are performed.

An open-loop and/or closed-loop control device 29, preferably comprising a microprocessor, may be provided for carrying out the method. The open-loop and/or closed-loop control device 29 may for example also comprise or implement and/or synchronize the controllers of the drive device 3, of the arresting device 12 and/or of the at least one impact tool 16.

In particular, a computer program with program code means may be provided in order to carry out the method according to the invention when the program is executed on an open-loop and/or closed-loop control device 29, in particular on a microprocessor.

Figure 3:
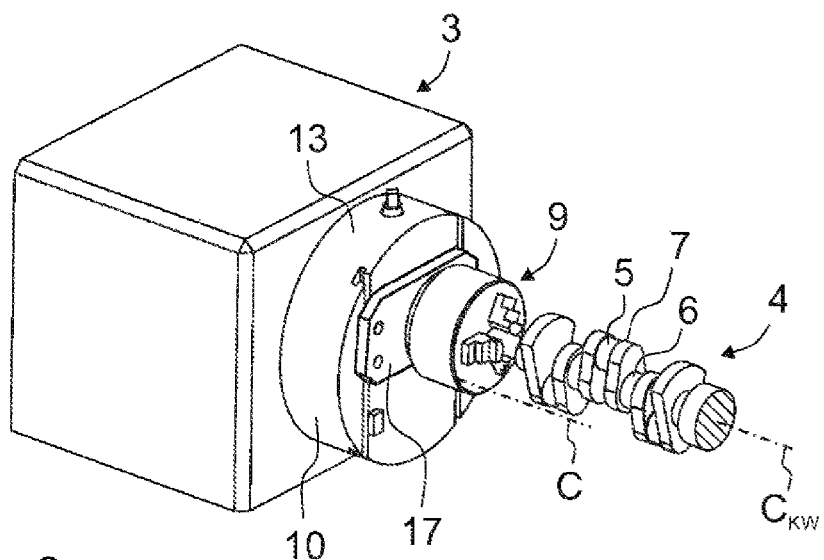

FIG. 3 illustrates, in a perspective view, a detail of a further apparatus for carrying out the method according to the invention—but without an impact device. Here, the apparatus of FIG. 3 is substantially identical to the apparatus of FIG. 1, for which reason only the important differences will be referred to below.

A drive device 3 is once again provided. In the embodiment of FIG. 3, it is furthermore the case that an optional arresting device (not visible) is also arranged within the drive device 3. Although the arresting device is preferably arranged as illustrated in FIG. 1, the arresting device may thus also be accommodated within the drive device 3. Provision is however nevertheless made here whereby the arresting device is activatable separately from the drive device 3. In FIG. 3, the arresting device is not a constituent part of the drive device 3. The drive device 3 may possibly additionally have a dedicated brake device.

Furthermore, a fastening device 9 is provided which has a fastening flange 10 and, fastened thereto, a face plate with clamping jaws for fixing the crankshaft 4. The face plate with the clamping jaws of the fastening device 9 is arranged on the fastening flange 10 adjustably on an alignment means 17, whereby the longitudinal axis $C_{KW}$ of the crankshaft 4 can be displaced relative to the axis of rotation C of the drive shaft 13.

The crankshaft 4 of FIG. 3 has a configuration which deviates from the crankshaft 4 of FIG. 1, but basically likewise comprises connecting-rod bearing journals 5, main bearing journals 6 and crank webs 7.

In FIG. 3 (as in FIG. 1, too), a further fastening device 9 may be provided at that end of the crankshaft 4 which is averted from the drive device 3, though said further fastening device may also be omitted.

Figure 4:
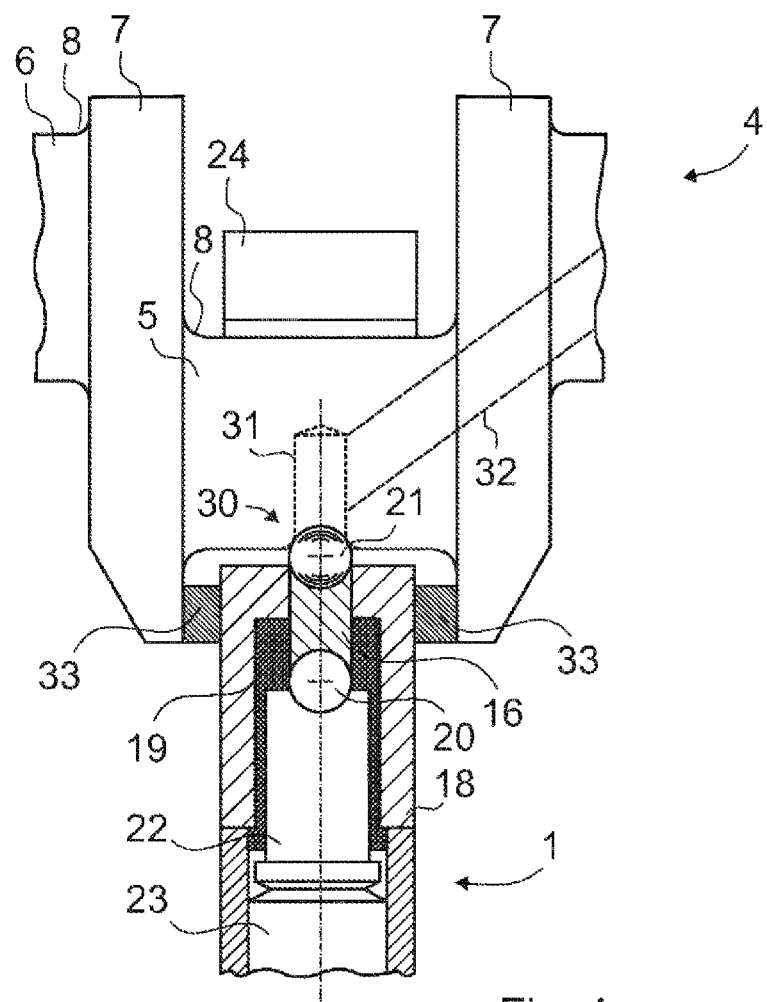

An impact device 1 of FIG. 1 is illustrated in more detail by way of example in FIG. 4. The method for impact hardening may basically be implemented using any impact device 1. The impact device 1 described below is however particularly suitable. It has a main body 18 which may be provided with a prismatic abutment corresponding to the radius of the crankshaft segment to be machined, and which preferably has guides 19 which guide an impact tool 16 and provide it with a corresponding degree of freedom in terms of the support angle about a deflection unit 20, which is advantageous for the adaptation to the dimensional conditions of the crankshaft 4. A ball as impact head 21 is arranged at the front end of the impact tool 16, that is to say the impact head 21 has a spherical surface for the impact hardening. An intermediate part 22 produces the connection between an impact piston 23 and the deflection unit 20, which transmits the impact energy to the impact tool 16. The intermediate part 22 may possibly also be omitted.

To increase the effectiveness of the impact, a clamping prism 24 may be fastened, via springs, by means of adjustable clamping bolts with clamping nuts to that side of the journal 5 which is averted from the main body 18 (not illustrated in detail here). Other structural solutions are also possible here.

By means of the arrangement of multiple impact devices 1 over the length of the crankshaft 4 to be machined, it is possible, as required, for several to all regions or oil bores 31 of the crankshaft 4 to be machined simultaneously.

In the crankshaft 4 illustrated in FIG. 4, an oil bore 31 is illustrated by dashed lines in the connecting-rod bearing journal 5, which oil bore runs centrally and perpendicularly in the connecting-rod bearing journal 5 and ends approximately in the middle of the connecting-rod bearing journal 5. A connecting bore 32 is provided for the connection to the oil circuit of the engine block via an adjoining main bearing journal 6. The connecting bore 32 leads to an oil bore (not illustrated in FIG. 4) of a main bearing journal 6. The impact device 1 and the impact tool 16 are, in the exemplary embodiment, aligned such that an oil bore end 30 of the oil bore 31 can be impact-hardened. For this purpose, the impact force is introduced into the oil bore end 30 by means of the impact head 21 of the impact tool 16.

For the alignment of the impact tool 16 with the oil bore end 30, the main body 18 of the impact device 1 is supported by two support elements 33 (or a multi-part or encircling support element) on the crank webs 7 that adjoin the connecting-rod bearing journals 5. The support elements 33 may also serve to ensure that the impact tool 16 does not buckle or slip during the impact hardening of the oil bore end 30.

It is basically possible for multiple, preferably a majority of, particularly preferably all, oil bore ends 30 of the connecting-rod bearing journals 5 and/or of the main bearing journals 6 to be work-hardened or impact-hardened. It is preferable for all oil bore ends 30 of all connecting-rod bearing journals 5 to be impact-hardened.

Figure 5A:
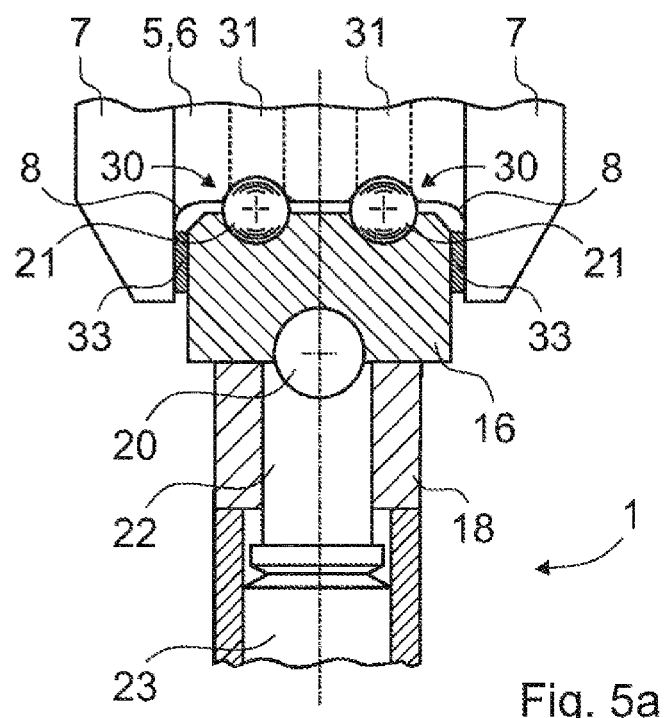

FIGS. 5a/5b illustrate a further impact device 1 which has an impact tool 16 on which two impact heads 21 are arranged in order to harden two oil bore ends 30 which are arranged axially offset along the main axis of rotation $C_{KW}$ of the crankshaft 4, or axis of rotation C, in the same journal 5, 6.

Here, the impact device 1 of FIGS. 5a/5b is basically of similar construction to the impact device 1 of FIG. 4, and is likewise illustrated merely schematically. The impact device 1 of FIGS. 5a/5b likewise has a deflecting unit 20 in order to distribute the impact force generated by the impact piston 23 between the impact heads 21 via an intermediate part 22. At the same time, the deflecting unit 20 can serve for optimally aligning the impact tool 16 with the oil bore ends 30. For support, it is once again possible for one or more support elements 33 or an encircling support element to be provided, which in the present case are arranged between the impact tool 16 and the corresponding crank webs 7.

Figure 5B:
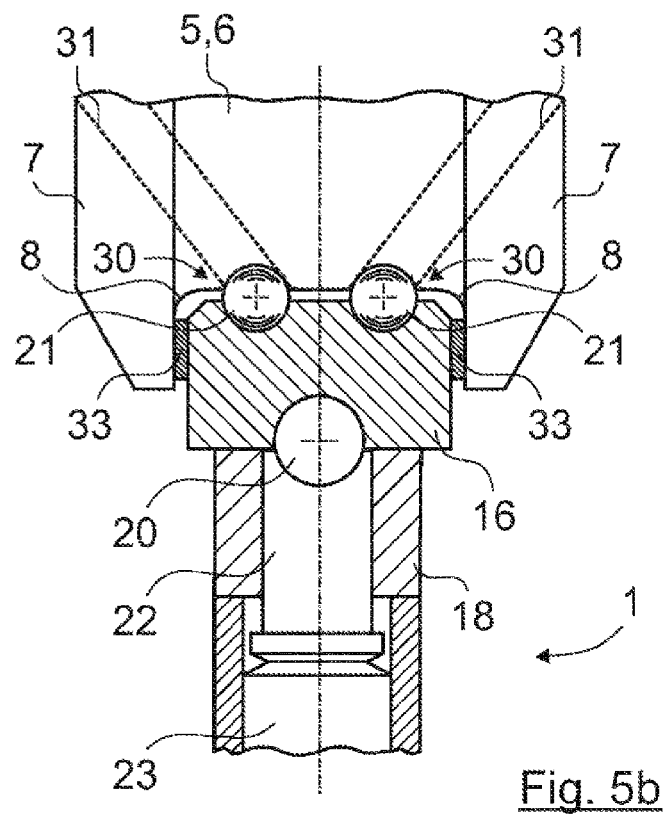

An impact device 1 may basically be used for the impact hardening of straight-running oil bores 31 (see FIG. 5a) or for the impact hardening of obliquely running oil bores 31 (see FIG. 5b). This self-evidently also applies if only one impact tool 16 and/or one impact head 21 and/or one oil bore 31 in one journal 5, 6 is to be hardened.

Provision may also be made whereby, for the work hardening of an oil bore 31 or of an oil bore end 30, a spherical body 34 is pushed through at least one portion of the oil bore 31. This is schematically illustrated in FIG. 6.

Here, provision may be made whereby the spherical body 34 is pushed in pulsed fashion or uniformly into the at least one portion of the oil bore 31. The spherical body 34 may also be an impact head 21 as already described. The spherical body 34 is preferably removed from the oil bore 31 again after the hardening of the internal walls of the oil bore 31.

Figure 6:
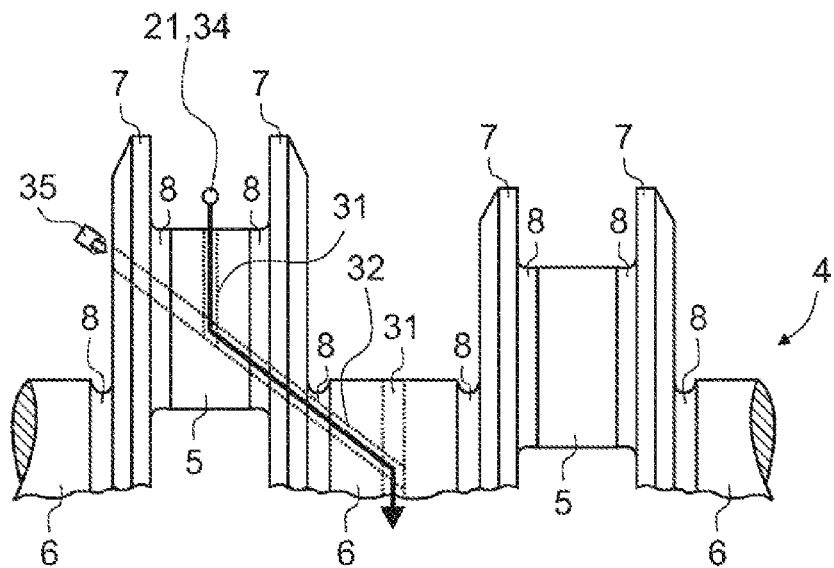

FIG. 6 shows an exemplary detail of a crankshaft 4 with in each case one oil bore 31 in a connecting-rod bearing journal 5 and a main bearing journal 6. A connecting bore 32 is formed between the two illustrated oil bores 31. During the later operation of the crankshaft 4, provision may then be made for the mouth of the connecting bore 32 at a crank web 7 to be closed using a sealing means 35 in order that the oil circuit is closed. As an alternative to this, it is also possible for one or both oil bores 31 to converge on one another obliquely.

As already stated above, provision may be made for the oil bore end 30 of an oil bore 31 of the connecting-rod bearing journal 5, or the entire oil bore 31 of the connecting-rod bearing journal 5 or any cylindrical portion 38 on the inside or on the internal walls of the oil bore 31, to be hardened by virtue of the spherical body 34 being pushed through the oil bore 31. For this purpose, the spherical body 34 has a slightly larger diameter than the oil bore 31.

If, owing to the application, it is necessary or advantageous for the spherical body 34 to be pushed into the oil bore 31 to such a depth that the spherical body 34 can no longer be pulled back or pulled out by the impact tool 16 or the pulling-out is considered disadvantageous, provision may be made whereby the spherical body 34 passes from the oil bore 31 of the connecting-rod bearing journal 5 directly, or via a connecting bore 32, to an oil bore 31 of an adjoining main bearing journal 6, wherein the connecting bore 32 and/or the oil bore 31 of the main bearing journal 6 have an inner diameter at least as large as the outer diameter of the spherical body 34.

Thus, as soon as the spherical body 34 has been pushed into the oil bore 31 to such a depth that the spherical body 34 arrives at the connecting bore 32, which has a larger diameter than the spherical body 34 and the oil bore 31 of the connecting-rod bearing journal 5, the spherical body 34 can pass, for example roll, through the connecting bore 32 to the oil bore 31 of the main bearing journal 6, from where the spherical body can be removed from the crankshaft 4 again if the oil bore 31 of the main bearing journal 6 also has a larger diameter than the spherical body 34.

Figure 7:
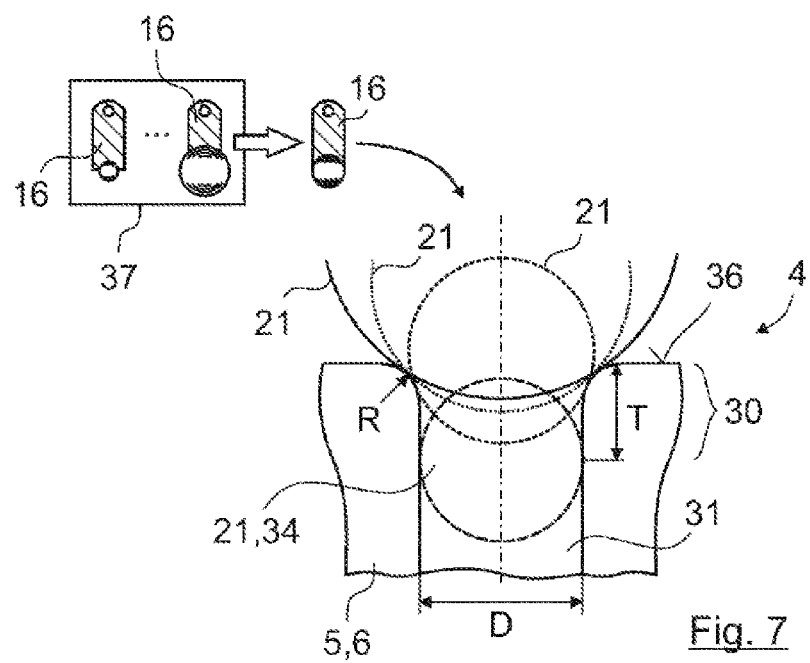

FIG. 7 shows an enlarged illustration of an oil bore end 30. At the transition to the running surface 36 of the corresponding journal 5, 6, the oil bore end 30 has a transition radius R which is impact-hardened. Instead of a transition radius R, the oil bore end 30 at the transition to the running surface 36 may also have any desired countersink. The oil bore end 30 may however also be provided without a transition radius R or a countersink. Provision may also be made whereby the oil bore end 30 has a transition radius R and a bevel 39, as illustrated in FIG. 11.

An oil bore end 30 of the oil bore 31 is also illustrated in FIG. 7. The oil bore end 30 may basically comprise only the mouth of the oil bore 31, that is to say for example the transition radius R and/or the bevel 39 (see FIG. 8 and FIG. 11). Provision may however also be made whereby the oil bore end 30 that is to be work-hardened projects into the oil bore 31 to a depth T. The depth T may be determined by simulations, calculations and/or series of tests of the respective crankshaft type.

Provision may be made whereby, for the impact hardening of the oil bore end 30, use is made of impact heads 21 with different diameters, in such a way that the impact heads 21 penetrate to different depths into the oil bore end 30 during the impact hardening.

For example, a changeover device 37 (merely schematically illustrated) may be provided for the purposes of selecting and/or changing over the impact heads 21. In the exemplary embodiment of FIG. 7, it is indicated in this regard that the changeover device 37 exchanges the impact tool 16 in order to change over the impact heads 21. Provision may however also be made for the changeover device 37 to directly change over the impact heads 21 or to change over the entire impact device 1.

Also illustrated in FIG. 7 is an impact head 21, which, as a spherical body 34, can be pushed through the oil bore 31. For this purpose, the impact tool 16 may for example be designed to eject the impact head 21 or the spherical body 34 after or during the pushing-in process. The internal walls of the oil bore 31 are preferably work-hardened at least as far as the depth T or extent of the oil bore end 30. The diameter of the spherical body 34 is selected, for the work hardening of the internal walls of the oil bore 31, larger than or equal to the diameter D of the oil bore 31.

Figure 8:
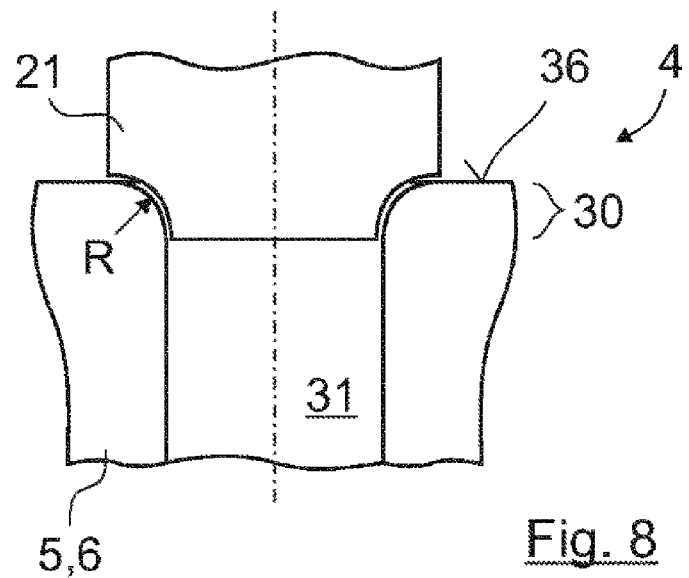

Finally, FIG. 8 shows a further oil bore end 30, which comprises only the transition radius R of the oil bore 31. For the impact hardening, an impact head 21 is used which has a shaping portion whose shape is adapted to the transition radius R, which is to be hardened, of the oil bore end 30.

Figure 9:
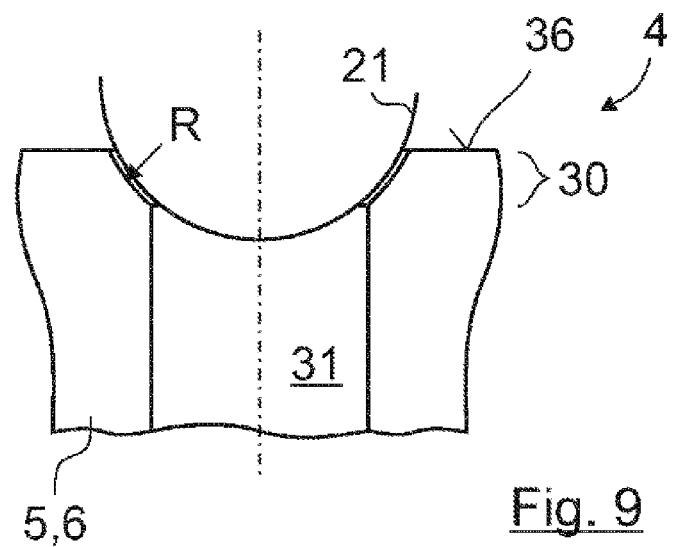

It is also possible for a countersink or a bevel 39 and/or a transition radius R of an oil bore end 30 to be generated in the first place by means of a shape-imparting impact tool 16 or a corresponding impact head 21 as a result of the impact hardening. Such a plastic deformation by means of an impact head 21 is shown in FIG. 9, wherein a round or symmetrical impact head 21 is indicated; this may however also be a non-symmetrical impact head 21 (any spherical cap). Any desired countersink can be generated through the selection of a corresponding impact head 21, for example also of an impact head 21 which has a shaping portion.

Finally, FIG. 10 shows a further impact device 1 which is equipped with only one impact tool 16. In the exemplary embodiment shown, the impact device 1 is not orthogonal but rather inclined obliquely with respect to the central axis or main axis of rotation $C_{KW}$ of the crankshaft 4, specifically such that the central axis or longitudinal axis $L_S$ of the impact tool 16 is aligned coaxially with respect to the central axis of the oil bore 31 in order to introduce the impact force along the central axis of the oil bore 31.

FIG. 11 shows a further oil bore 31 within a journal 5, 6 of a crankshaft 4 for the purposes of illustrating the terminology. The oil bore 31 illustrated in FIG. 11 has a transition radius R at the transition to the running surface 36 of the journal 5, 6, which transition radius is adjoined by a bevel 39. In the exemplary embodiment of FIG. 11, the oil bore mouth 30 is defined as extending from the transition radius R to the depth T, and accordingly also comprises an upper cylindrical portion 43 of the oil bore 31. According to the invention, provision may be made for the oil bore mouth 30 to be work-hardened as far as a depth T, that is to say for the transition radius R, the bevel 39 and the upper cylinder portion 43 of the oil bore 31 to be work-hardened. In the context of the invention, it is however also possible for only the transition radius R, only the bevel 39, only the transition radius R and the bevel 39, or only the bevel 39 and the upper cylindrical portion 43 of the oil bore 31, to be work-hardened.

Provision may also be made for only one or more arbitrary cylindrical portions 38 within the oil bore 31 to be work-hardened. An exemplary cylindrical portion 38 is illustrated in FIG. 11. The cylindrical portion 38 may comprise a part of any size of the cylindrical part of the oil bore 31. The cylindrical portion 38 may adjoin the bevel 39, though may also be spaced apart from the bevel 39. The cylindrical portion 38 may also be formed in multiple parts in the cylindrical part of the oil bore 31.

Various impact tools 16 may be used for the hardening of a cylindrical portion 38 of an oil bore 31. Three exemplary embodiments are shown in FIGS. 12 to 14. Here, in each case, provision is made whereby the impact tool 16 is introduced with at least one impact head 21 into the oil bore 31 as far as a desired depth, following which, for the work hardening (preferably impact hardening) of the at least one cylindrical portion 38 of the oil bore 31, the at least one impact head 21 is pushed radially out of the impact tool 16 and against an internal wall 40 of the at least one cylindrical portion 38.

In FIG. 12, merely for illustrative purposes, the right-hand impact head 21 is illustrated in a position bearing against the internal wall 40, whereas the left-hand impact head 21 is still situated in its initial position. The impact heads 21 are preferably pushed outward symmetrically.

To secure the impact heads 21 in their initial position, corresponding shoulders etc. may be provided in the impact tool 16, as indicated in FIGS. 12 and 13.

Basically any number of impact heads 21 may be provided. For example, one, two, three, four, five, six or even more impact heads 21, which are in particular arranged symmetrically around a central axis M of the impact tool 16. In the exemplary embodiment of FIG. 12, two impact heads 21 are illustrated, wherein a further impact head 21 (preferably of a further impact head pair) is indicated by way of example using dashed lines.

The impact heads 21 may also be arranged at different height levels, as illustrated in FIG. 13. In this way, it is possible to machine a relatively large cylindrical portion without axial adjustment, or with relatively little axial adjustment, of the impact tool 16.

Provision may additionally be made for the impact tool 16 to be rotated along the central axis of the oil bore 31 during the machining process, in order to perform the most uniform and complete possible machining of the internal surface of the oil bore 31. This is indicated in FIGS. 12 to 14 by means of corresponding arrows.

Provision may be made whereby the at least one impact head 21 is pushed radially out of the impact tool 16 hydraulically, pneumatically or electromechanically. For this purpose, the impact tool 16 may have a corresponding compressed-air or liquid supply 41. Alternatively, as illustrated in FIG. 14, a mechanical adjustment of the at least one impact head 21 may be provided, for example by means of a wedge 42 or a ball screw drive (not illustrated). FIG. 14 illustrates an embodiment in which a double wedge 42 is used which simultaneously axially secures the impact heads 21. It is however also possible for only a single wedge to be provided (for example only the upper half of the double wedge 42), if the impact heads 21 are secured in some other way against falling out of the impact tool 16.

What is claimed is:

1. A method for the work hardening of a crankshaft which has connecting-rod bearing journals, main bearing journals and crank webs, wherein the connecting-rod bearing journals and the main bearing journals have oil bores, wherein the oil bore end has a bevel and/or has a transition radius at the transition to a running surface of the respective journal, wherein the transition radius and/or the bevel of at least one oil bore end of one of the oil bores of a respective journal is work-hardened by an impact force being introduced into the oil bore end by an impact head having a shaping portion whose shape is adapted to the transition radius to be hardened and/or to the bevel of the oil bore end, wherein an impact tool comprises the impact head whose shape is adapted to the transition radius to be hardened and/or to the bevel of the oil bore end, wherein, the impact tool comprises at least two impact heads, each impact head of the at least two impact heads having a different diameter for the impact hardening of the oil bore end, and the impact heads of the at least two impact heads of the impact tool penetrate to different depths into the oil bore end during the impact hardening and wherein a changeover device exchanges the impact heads of the at least two impact heads of the impact tool.

2. The method as claimed in claim 1, wherein the impact tool further comprising at least two impact heads that are arranged to harden two oil bore ends which are arranged axially offset along a main axis of rotation of the crankshaft.

3. The method as claimed in claim 1, wherein a main body of the impact tool is supported by two support elements between two crank webs that surround the bearing journal that has the oil bore that is to be impact-hardened.

4. The method as claimed in claim 1, wherein at least one impact head of the impact tool for the impact hardening has a spherical surface.

5. The method as claimed in claim 1, wherein, during the impact hardening of one of the oil bore ends, a transition radius of the oil bore end or a countersink of the oil bore end is generated by at least one impact head of the impact tool.

6. The method as claimed in claim 1, wherein multiple oil bore ends of the connecting-rod bearing journals and/or of the main bearing journals are work-hardened.

7. The method as claimed in claim 1, wherein, for the impact hardening of one of the oil bore ends of the oil bores, the crankshaft is firstly rotated by a drive device along a direction of rotation into an impact position, following which an arresting device is used in order to arrest the crankshaft in the impact position, following which the impact force is introduced into the oil bore end of the oil bores by the impact tool.

8. The method as claimed in claim 1, wherein the impact tool is introduced with at least one impact head into the oil bore, following which, for the work hardening of the oil bore end, the at least one impact head is pushed radially out of the impact tool and against an internal wall of the oil bore end.

9. The method as claimed in claim 8, wherein the at least one impact head is pushed radially out of the impact tool hydraulically.

10. The method as claimed in claim 8, further comprising mechanically pushing the at least one impact head out of the impact tool using at least one wedge.

11. The method as claimed in claim 8, further comprising pneumatically pushing the at least one impact head radially out of the impact tool.

12. The method as claimed in claim 8, further comprising electromechanically pushing the at least one impact head radially out of the impact tool.

13. The method as claimed in claim 8, further comprising mechanically pushing the at least one impact head radially out of the impact tool using at least one ball screw drive.

* * * * *